Patented Jan. 3, 1928.

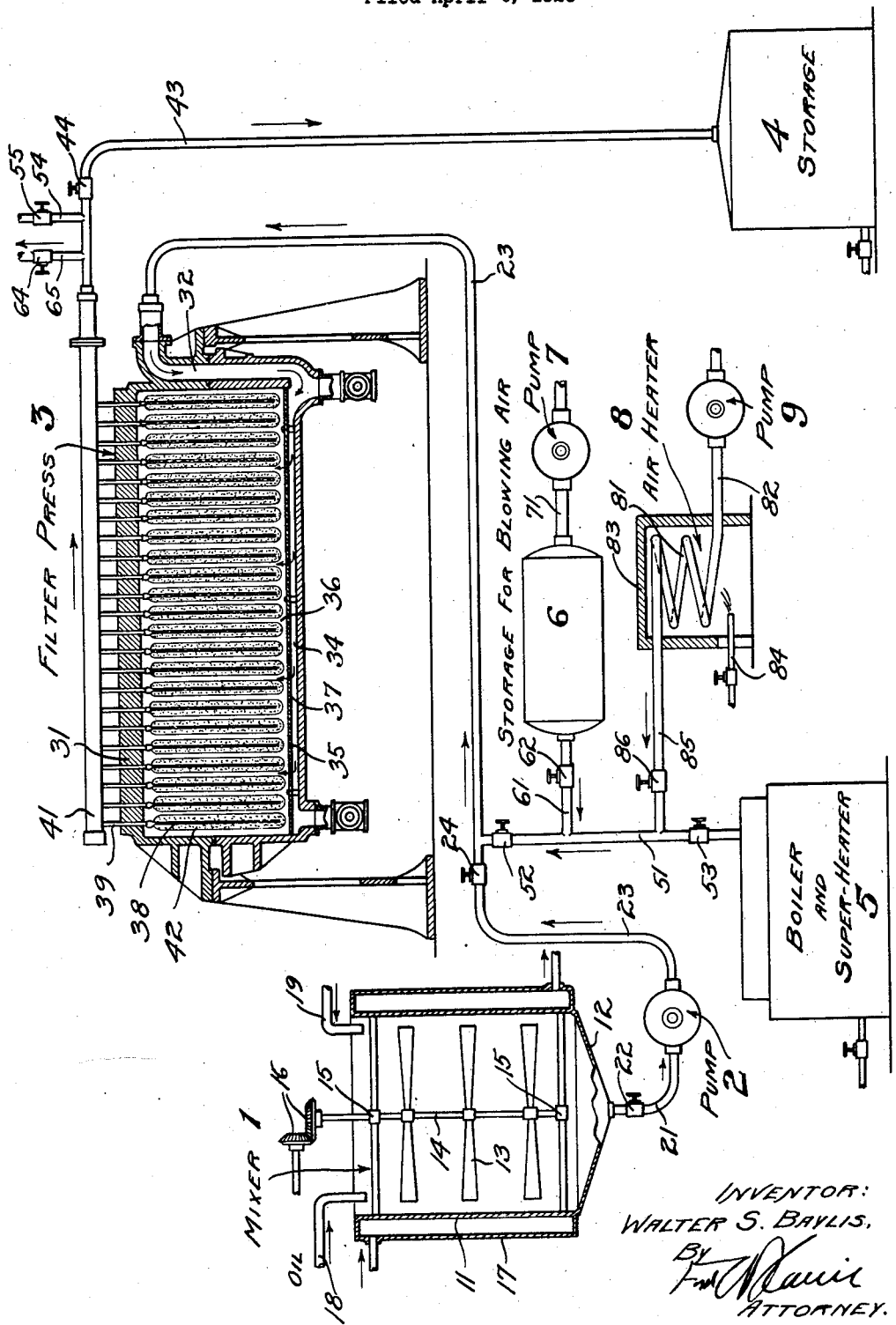

1,654,629

UNITED STATES PATENT OFFICE.

WALTER S. BAYLIS, OF LOS ANGELES, CALIFORNIA, ASSIGNOR TO FILTROL COMPANY, OF LOS ANGELES, CALIFORNIA, A CORPORATION OF NEVADA.

PROCESS OF REACTIVATION OF ADSORPTIVE MATERIAL.

Application filed April 5, 1926. Serial No. 99,950.

My invention relates to a process of reactivating an adsorptive material. In various refining processes and particularly in certain oil refining processes it is sometimes the practice to employ an adsorptive material for adsorbing impurities from the matter being refined. This adsorptive material is usually an acid treated clay, and it is mixed with the matter to be refined so that the impurities thereof are adsorbed by this clay. The adsorptive material is later filtered from the matter being refined, which passes from the filter in a purified condition.

It is an object of this invention to provide a process for removing impurities from a spent adsorptive material, thus returning it to original condition suitable for reuse.

It is another object of this invention to provide a process of removing impurities from a spent adsorptive material, in which the impurities are removed while the spent adsorptive material is still in the filter in which it was separated from the matter being refined.

It is a further object of this invention to provide a process of the character mentioned which involves the burning of impurities from the adsorptive material.

Other objects and advantages of the invention will be made manifest hereinafter.

Referring to the drawing in which I illustrate an apparatus for conducting the process of my invention, 1 is a mixer, 2 is a pressure pump, 3 is a filter press, 4 is a storage tank, 5 is a boiler and superheater, 6 is a storage tank for blowing air, 7 is an air pump, 8 is an air heater and 9 is an air heater pump.

The mixer 1 consists of a shell 11 having a conical bottom 12. Mixing paddles 13 are rigidly secured on a shaft 14 in the mixer 1, this shaft 14 being journaled in bearings 15. The shaft 14 is adapted to be driven in a manner to operate the paddles 13 by means of gearing 16 situated at the upper end of the shaft 14. A jacket 17 surrounds the shell 11 providing a heating chamber adapted to receive superheated steam or hot oil by means of which the interior of the shell 11 may be brought to a desired temperature.

In this illustration of my invention I shall describe a process in which the adsorptive material is employed for refining oil. This oil is introduced into the mixer 1 by means of a pipe 18. A small percentage of adsorptive material is introduced into the body of oil in the mixer 1 through a suitable conduit, as indicated at 19.

As previously mentioned, this adsorptive material is generally in the form of a treated clay. In practice, I have found that filtrol is a very effective adsorptive material and also have found that it possesses certain qualities which render it very suitable for such use. Filtrol is a special acid treated clay which is free from glazing materials possessed by natural clays and which will withstand a temperature of over 1000 degrees Fahrenheit without any decomposition.

The oil and adsorptive material are thoroughly mixed in the mixer 1, this mixture being heated to a temperature of about 212 degrees Fahrenheit. The adsorptive material acts upon the oil in such a manner as to adsorb the impurities therefrom, these impurities usually consisting of resinous and carbonaceous matter and hydrocarbons of unsaturated and aromatic groups which give the oil dark color and unpleasant odor.

After the oil and adsorptive material have been mixed for a proper length of time the mixing operation is arrested and the mixture is conveyed to the filter press 3. A pipe 21 extends from the conical bottom 12 of the mixer 1 to the pump 2, this pipe 21 having a valve 22 which is closed during the mixing of the oil and adsorptive material. This valve 22, however, is opened at this time and the pump 2 is set into operation. Extending from the pump 2 to the filter press 3 is a pipe 23 having a valve 24 which is at this time opened. The pump when set into operation draws the mixture from the mixer 1 through the pipe 21 and forces it through the pipe 23 into the filter press 3.

For reasons which will be stated hereinafter, I desire to use a Sweetland filter press or one which has similar characteristics. The filter press 3 is provided in the form of a housing or shell 31 having an inlet 32 provided at one end thereof with which the pipe 23 connects. This inlet 32 connects with a passage 34 formed below a partition 35. The passage 34 communicates with a chamber 36 of the shell 31 through a plurality of openings 37 formed in the partition 35. Situated in the chamber 36 is a multiplicity of filter bags 38 which are supported on the inner ends of nipples 39 which extend through the upper part of the shell 3, these nipples 39 connecting with the interiors of the bags 38. The bags 38 are preferably formed of a fabric which is made from a metallic material so that they may withstand very high temperatures. The metallic bag is one of the features of the Sweetland press and constitutes one of the reasons for desiring to use this press. The nipples 39 connect with a header 41 of the filter press 3.

The mixture of oil and adsorptive material passes through the inlet 32 into the passage 34 below the partition 35. The mixture passes through the openings 37 of the partition 35 into the chamber 36. The oil of the mixture passes through the walls of the filter bags 38 and from thence passes through the nipples 39 into the header 41. The mesh of the bags 38 is quite fine and the adsorptive material impregnated with impurities cannot pass therethrough. The adsorptive material therefore collects in cakes on the exterior of the filter bags 38, as indicated at 42 in the drawings.

The oil passing into the header 41 is substantially free from impurities and undesirable substances. The oil is conveyed from the header 41 of the filter press 3 by means of a pipe 43 having a valve 44 which is open at this time. The pipe 43 connects the header 41 with the storage tank 4.

After a batch of oil and adsorptive material has been passed through the filter press 3 the operation of the pump 2 is stopped and the valves 22 and 24 in the pipes 21 and 23 are closed. Extending from the boiler and superheater 5 to the pipe 23 is a pipe 51 having valves 52 and 53 which are closed during the pumping of the mixture through the filter press 3. It should be noted in the drawings that the pipe 51 connects to the pipe 23 at the right of the valve 24.

The valve 52 is fully opened and the valve 53 is partially opened so that steam will be supplied through the pipes 51 and 23 to the filter press 3. This steam passes through the cakes 42 formed on the filter bags 38 and vaporizes any oil contained therein. The steam and oil vapors pass through the pipe 43 as far as the valve 44 which is now closed and are from thence conducted through a pipe 54 having a valve 55. The valve 55 is closed during the pumping of the mixture through the system but is open while the steam is being passed through the filter 3 for the purpose of evaporating the oil therefrom. After this action has taken place for a proper length of time, the valve 53 is closed, thus shutting down the supply of steam to the filter press 3. The valve 55 is then closed.

The pump 7 is connected to the storage tank 6 by means of a pipe 71 and compresses air in this storage tank. The storage tank 6 is connected to the pipe 51 by a pipe 61 having a valve 62. The valve 62 in the pipe 61 is then opened and air is supplied to the filter 3 for the purpose of removing moisture from the cakes 42 on the filter bags 38. A valve 64 in a branch 65 of the pipe 43 is at this time opened, thus connecting the header 41 with the exterior; the drying air therefor passes through the cakes 42 in the filter press 3, removing any moisture from these cakes and then passes to the exterior through the pipe 65. When the cakes 42 have been properly dried, the valve 62 in the pipe 61 is closed and the flow of air through the filter press 3 is discontinued.

The next operation is to burn the impurities from the cakes 42 on the bags 38. The pump 9 is connected to a coil 81 of the air heater 8 by means of a pipe 82. This coil 81 is placed in a furnace 83 which is heated by a burner 84. The coil 81 is connected to the pipe 51 by a pipe 85 having a valve 86. The pump 9 is set into operation and air is forced through the coil 81 of the air heater 8. The air is heated to a proper temperature in the coil 81. The valve 86 and the valve 53 are then opened to permit proper amounts of air and superheated steam to pass through the pipe 51, the pipe 23 and into the still 3. The superheated steam raises the temperature of the cake 42 much above the kindling temperature of the impurities contained therein. The superheated steam in most instances is about 750 degrees Fahrenheit. The air in the mixture supplies oxygen to support the combustion of the impurities in the cake 42 and the impurities are therefore all burned away. I have found that filtrol, the character of which has been previously mentioned, is very suitable for this use due to the fact that it is not broken down or glazed due to the high temperatures to which it is subjected. The steam and air and products of combustion of the impurities of the cakes 42 pass to the exterior through the pipe 65 and the valve 64.

After this treatment of the cakes 42 has been continued for a length of time sufficient to entirely burn the impurities, the valves 53 and 86 are closed and the pump 9 is shut down. After this, the filter 3 is opened and the cakes 42 are removed therefrom. The cakes consist of pure adsorptive material which is in condition for reuse.

From the foregoing description it will be seen that by my process adsorptive material may be reactivated and reused any number of times, this being very economical. My process is adapted for use in conjunction with a refining process which is very economical due to the fact that the adsorptive material may be reactivated while it is still in the filter press of the refining equipment. This eliminates an additional handling of the adsorptive material.

I claim as my invention:

1. A process of reactivating an adsorptive material comprising: forming an adsorptive material carrying combustible impurities into a mass; passing superheated steam through said mass to raise the temperature above the kindling point of said impurities; and supplying oxygen to said mass to support the combustion of said impurities.

2. A process of reactivating an adsorptive material comprising: forming a filter clay carrying combustible impurities into a mass; passing superheated steam through said mass to raise the temperature above the kindling point of said impurities; and supplying oxygen to said mass to support the combustion of said impurities.

3. A process of reactivating an adsorptive material which has previously been deposited as a cake in a filter press, said cake containing combustible impurities, which comprises: blowing superheated steam through said cake while said cake is in place in the filter, said steam being at a sufficiently high temperature and said blowing operation being continued for a sufficient period to raise the temperature of said cake above the kindling point of the impurities in said cake; and blowing oxygen through said cake in sufficient amounts and for a sufficient period to completely consume any carbonaceous impurities in said cake.

4. A process of reactivating an adsorptive material which has previously been deposited as a cake in a filter press, said cake containing combustible impurities, which comprises: blowing superheated steam through said cake while said cake is in place in the filter, said steam being at a sufficiently high temperature and said blowing operation being continued for a sufficient period to raise the temperature of said cake above the kindling point of the impurities in said cake; and blowing oxygen heated above said kindling point through said cake in sufficient amounts and for a sufficient period to completely consume any carbonaceous impurities in said cake.

5. A process of reactivating an adsorptive material which has previously been deposited as a cake in a filter press, said cake containing combustible impurities, which comprises: blowing superheated steam through said cake while said cake is in place in the filter, said steam being at a sufficiently high temperature and said blowing operation being continued for a sufficient period to raise the temperature of said cake above the kindling point of the impurities in said cake; and simultaneously blowing oxygen through said cake in sufficient amounts and for a sufficient period to completely consume any carbonaceous impurities in said cake.

6. A process of reactivating an adsorptive material which has previously been deposited as a cake in a filter press, said cake containing combustible impurities, which comprises: blowing superheated steam through said cake while said cake is in place in the filter, said steam being at a sufficiently high temperature and said blowing operation being continued for a sufficient period to raise the temperature of said cake above the kindling point of the impurities in said cake; and simultaneously blowing oxygen heated above said kindling point through said cake in sufficient amounts and for a sufficient period to completely consume any carbonaceous impurities in said cake.

In testimony whereof, I have hereunto set my hand at Los Angeles, California, this 29th day of March, 1926.

WALTER S. BAYLIS.